April 18, 1933. P. V. FLORIDO 1,903,757
FAUCET STRUCTURE
Filed March 14, 1932

Inventor

Pablo V. Florido

By Gardner J. O'Bayle
Attorney

Patented Apr. 18, 1933

1,903,757

UNITED STATES PATENT OFFICE

PABLO VILAR FLORIDO, OF ANNAPOLIS, MARYLAND

FAUCET STRUCTURE

Application filed March 14, 1932. Serial No. 598,826.

My invention relates to faucets and more particularly to faucets of the self-closing type.

Heretofore, it has been proposed to make faucets of the self-closing type wherein, the valve mechanism is operated by spring means adapted to maintain the valve in a closed position. In addition to the spring means for closing the valve, the prior art devices also make use of washers, rings, or other packing means for the purpose of obtaining a tight joint between the valve and the inlet and outlet ports of the faucet.

The present invention comprehends a novel valve structure wherein the natural pressure of the fluid which is to be controlled, by the faucet, is utilized to effect a positive closing of the valve. The valve seats are formed integral with the faucet body and non-leak joints are provided without the use of any packing whatsoever.

An object of my invention is to provide a self-closing faucet having a novel valve structure adapted to be forcibly closed by the action of the fluid, the flow of which is to be controlled by the valve.

Another object of my invention is to provide a faucet having a plurality of inlet and outlet ports whereby the flow of fluid through the valve ports may be effectively controlled so as to prevent leakage.

Yet another object of my invention is to provide a leak proof faucet having valve seats formed integral with the body of the faucet and designed to prevent leakage without the use of washers or other packing means.

Still another object of my invention is to provide a self-closing and leak proof faucet having a movable valve member adapted to be securely wedged against its seat by the pressure of the fluid entering the valve, when the valve is in the closed position.

A still further object of my invention is to provide a valve structure which is strong and sturdy in construction, consisting of but few parts not liable to get out of order even after long and continued use.

With these and other objects in view, which may be incident to my improvements, the invention consists in the parts and combinations to be hereinafter set forth and claimed, with the understanding that the several necessary elements, comprising my invention may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

Figure 1:
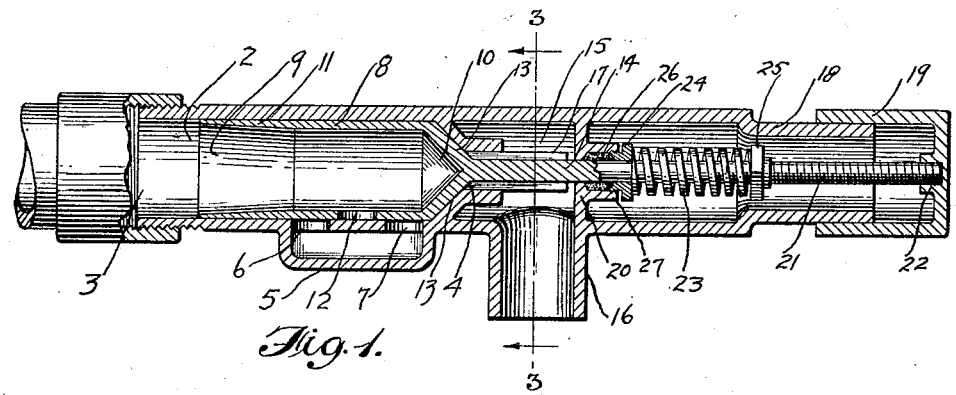
Figure 1 is a longitudinal sectional view of my improved faucet, showing the valve in closed position.

Referring to the drawing and more particularly to Figure 1 thereof, I have shown my improved faucet comprising a casing 1 having a valve chamber 2 formed therein. The casing is provided with a primary inlet port 3, primary outlet 4 and a well member 5. Between the well member and the interior of the casing, are ports 6 and 7, the former being a secondary inlet port while the latter is a secondary outlet port.

The movable valve member 8 consists of a hollow cylinder having an open end 9 and a closed end 10. It will be noted that the interior wall of the cylinder adjacent its open end is tapered as at 11, the end of the cylinder being of substantially the same diameter as the internal diameter of the casing. The cylinder forming the valve member is further provided with an opening or aperture 12 and the closed end 10 of the cylinder is conical shaped and adapted to seat in the sloping wall section 13 of the valve casing.

Attached to the conical end of the valve member is a push rod 14, which is slidably mounted between the walls of the casing, which form the intermediate chamber 15 having a discharge nozzle 16. The portion of the push rod near the point of attachment to the valve 8 is cut away to form projections or wing members 17.

The part of the casing extending beyond the intermediate chamber 15 is provided with a reduced portion 18 adapted to receive a push member or button 19. The push rod 14 is extended through the wall 20 of the intermediate chamber and is provided with a threaded portion 21 which is screwed into the internally threaded portion 22 of the button 19.

Between the bearing portion of the wall 20 and the threaded portion 21 of the rod, there is mounted a spring 23 tending to force the rod and the button 19 to their extreme position to the right of the faucet casing. The spring 23 is seated between packing gland 24 and nut 25, the tension of the spring being adjusted by means of nut 25 which may be moved along the threaded portion 21 of the push rod.

In order to prevent any possibility of liquid passing through the opening in the wall 20, packing 26 is provided in the recessed portion 27 formed integral with the wall 20. The recessed portion 27 is threaded internally and the gland 24 is adapted to be screwed down into the recess, thus forcing the packing into tight engagement with the sides of the recess and the surface of the push rod.

Figure 2:
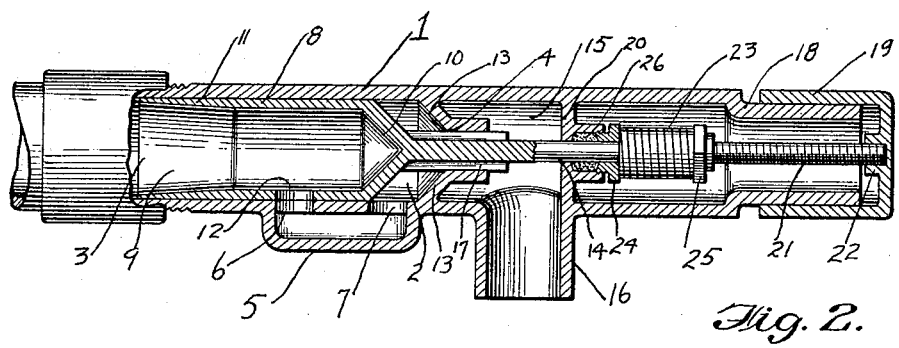
Fig. 2 is a sectional view of the faucet showing the valve in the open position.

Referring to Figure 2, the faucet is shown in the open position. When the valve 8 is moved to the left a sufficient distance, port 12 registers with the secondary inlet port 6 and the secondary outlet port 7 is uncovered. The primary outlet port 4 is also opened, thus permitting liquid to pass into the intermediate chamber 15 and out of the nozzle 16. It will be noted that the tapered portion 11 of the cylinder 8 is so designed that a thin edge is exposed to the incoming fluid, thereby reducing frictional resistance offered to the flow of the fluid to a minimum.

Figure 3:
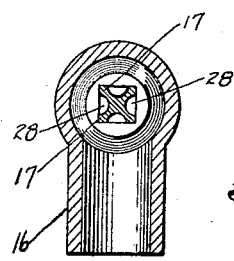
Fig. 3 is a vertical sectional view taken along line 3—3 of Figure 1.

Referring to Figure 3, it will be seen that the primary outlet port 4 is rectangular in cross section and that between the projections or wings 17, a plurality of channels 28 are formed. The fluid passing through the faucet is thus provided with a number of paths by means of which it may reach the intermediate chamber.

In the operation of the faucet, assuming that the parts are as shown in Figure 1, the valve being in the closed position, liquid entering the inlet port 3 passes into the cylindrical valve 8 and tends to force the conical shaped head 10 firmly against the walls 13 forming the valve seat. In this position of the valve, all of the ports are closed except the primary inlet port and the liquid is prevented from passing to the exterior of the cylindrical valve. When it is desired to withdraw liquid from the source to which the faucet is attached, the push button 19 is forced to the left, moving the valve 8 so that the parts assume the position shown in Figure 2. The port 12 is then in register with the secondary inlet port 6 and the conical head 10 of the valve is moved away from its seat and opening the primary outlet port 4. The liquid entering the primary inlet port 3 passes into the interior of the cylindrical valve through ports 12 and 6 into the well 5, through ports 7 and 4 into the intermediate chamber 15 and out of the nozzle 16.

It will now be appreciated that I have provided a novel self-closing faucet structure in which the valve member is forcibly closed and maintained in the closed position by means of the pressure of the fluid entering the faucet. The moving parts of the faucet are designed to operate with minimum friction and fluid tight closing means for the various valve ports is obtained without the use of washers or packing.

While I have shown and described the preferred embodiment of my invention, I wish it to be understood that I do not confine myself to the precise details of construction herein set forth, by way of illustrations, as it is apparent that many changes and variations may be made therein, by those skilled in the art, without departing from the spirit of the invention, or exceeding the scope of the appended claims.

What is claimed is:

1. In a self-closing faucet, the combination of a casing having a valve chamber formed therein, a plurality of outlet ports arranged in series in said casing and a valve member adapted to simultaneously open or close said ports.

2. In a self-closing faucet, the combination of a casing having a valve chamber therein, a plurality of outlet ports arranged in series in said chamber, a movable cylindrically shaped valve member adapted to simultaneously open or close said ports.

3. In a self-closing faucet, the combination of a casing having a valve chamber therein, a primary inlet, a secondary inlet and two outlet ports arranged in series in said chamber and a movable valve member adapted to simultaneously open or close said secondary inlet and the outlet ports.

4. In a self-closing faucet, the combination of a casing having a valve chamber therein, a primary inlet, a secondary inlet and two outlet ports arranged in series in said chamber and a movable cylindrically shaped valve member adapted to simultaneously open or close said secondary inlet and the outlet ports.

5. In a self-closing faucet, the combination of a casing having a valve chamber therein, an inlet and a plurality of outlet ports arranged in series in said chamber, and a movable valve member adapted to simultaneously open or close the outlet ports, said valve member being hollow and provided with an opening registering with the inlet port.

6. In a self-closing faucet, the combination of a casing having a valve chamber therein, primary and secondary inlet and outlet ports arranged in series in said casing and a movable valve member adapted to simultaneously open or close the outlet ports and the secondary inlet port.

7. In a self-closing faucet, the combination of a casing having a valve chamber therein, primary and secondary inlet and outlet ports arranged in series in said casing, and a movable hollow valve member open at one end, adapted to open or close the outlet ports and the secondary inlet port.

8. In a self-closing faucet, the combination of a casing having a valve chamber therein, primary inlet and outlet ports in said casing, a well formed on the casing, secondary inlet and outlet ports formed in the well, casing and communicating with the well, and a movable valve member adapted to simultaneously open or close the outlet ports and the secondary inlet port.

9. In a self-closing faucet, the combination of a casing having a valve chamber therein, primary inlet and outlet ports in said casing, a well formed integral with the casing, secondary inlet and outlet ports in the portion of the casing contiguous to the well, and a movable valve member adapted to simultaneously open or close the outlet ports and the secondary inlet port.

10. In a self-closing faucet, the combination of a casing having a valve chamber therein, primary inlet and outlet ports in said casing, a well formed integral with the casing, secondary inlet and outlet ports in the portion of the casing contiguous to the well, and a movable hollow cylindrically shaped valve member open at one end and adapted to simultaneously open or close the outlet ports and the secondary inlet port.

11. In a self-closing and leak proof faucet, the combination of a casing having a valve chamber therein, a primary inlet, a secondary inlet and a plurality of outlet ports arranged n series in said chamber and a movable valve member comprising a hollow cylinder open at one end and closed at one end and having a tapered portion at its open end, said valve being adapted to simultaneously open or close said secondary inlet and the outlet ports.

12. In a self-closing and leak proof faucet, the combination of a casing having a valve chamber therein, said casing having a primary and a secondary inlet and a plurality of outlet ports arranged in series and a well member, a movable valve member comprising a hollow cylinder having an open end and its interior wall tapered at its open end and a conical shaped closed end, said valve being adapted to open or close said secondary inlet and the outlet ports.

13. In a self-closing and leak proof faucet, the combination of a casing having a valve chamber therein, said casing having inlet and outlet ports and a well member, openings in the casing contiguous to the well member and to the valve chamber, a valve seat adjacent the outlet port and a movable valve member comprising a hollow cylinder open at one end and having an opening in its wall and, having its interior wall tapered at its open end and a conical shaped closed end, the closed end being adapted to seat in that portion of the casing adjacent the outlet port when the valve is in the closed position.

14. A self-closing and leak proof faucet, comprising, a casing having a valve chamber including inlet and outlet ports formed therein, and a movable valve member comprising a hollow cylinder having an open end and its interior wall tapered at its open end and a conical shaped closed end, said open end communicating with the inlet port in the casing whereby fluid entering the port tends to close the valve and force the closed end of the cylinder into its seat in the outlet port.

In testimony whereof I affix my signature.

PABLO VILAR FLORIDO.